Sept. 15, 1959  E. H. WILEY  2,904,714
ELECTRIC LAMP
Filed June 16, 1958
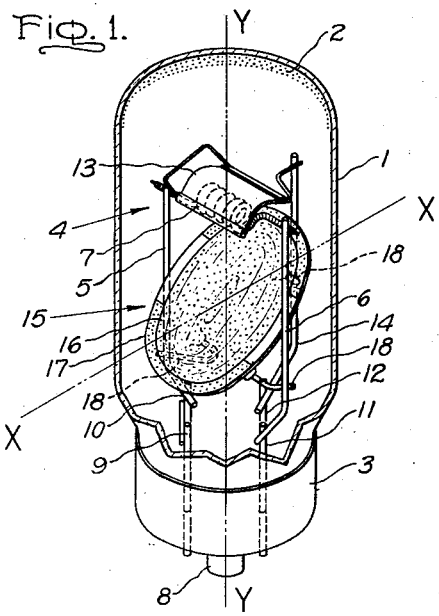
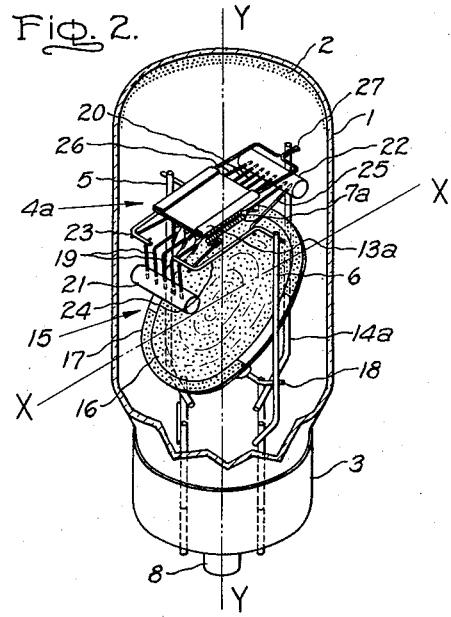
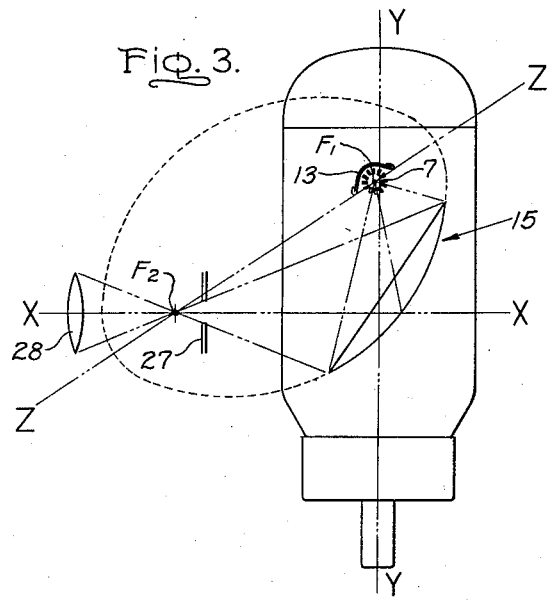
Inventor:
Emmett H. Wiley,
by Andrew J. Bootz
His Attorney.

United States Patent Office 2,904,714
Patented Sept. 15, 1959

2,904,714
ELECTRIC LAMP

Emmett H. Wiley, Willowick, Ohio, assignor to General Electric Company, a corporation of New York Application June 16, 1958, Serial No. 742,384

10 Claims. (Cl. 313—113)

This invention relates to electric lamps and more particularly to incandescent electric lamps of the type suitable for use in photographic projectors.

Conventional photographic projection systems employing an incandescent electric lamp as their light source either comprise a reflector placed axially behind the light source so that the light from the incandescent lamp and the reflected light from the reflector is projected axially through a glass condenser lens to a transparent film at the projector film gate and then into and through the projector lens; or may comprise a condensing reflector used without the glass condensing lens.

In such projector systems the maximum amount of projected light available on the screen for a given light source brightness occurs when the light source, or apparent light source, completely fills the projector lens; that is, when nothing but the source or apparent source may be seen in any direction through the two limiting apertures, the film gate and the projector lens. Since it is impractical to completely fill the projector system by directly increasing the source size, a reasonably large portion of the system must be filled by the apparent source as seen with a condenser system. However, the glass condenser system suffers from reflection losses at all glass to air interfaces and the reflective losses increase toward the edges of the lens where the angle of incidence is the greatest; therefore, the optimum uniformity of illumination of the transparency is lost. Such a glass condenser system further presents undesirable chromatic distortions.

On the other hand, an axial condensing reflector system (not employing a glass condenser lens) may not suffer from many of the above described effects but the conventional axial reflector systems suffer due to dark areas caused by shadows of the lead-in wires required to support the light source and supply it with electrical power, thereby not presenting optimum uniformity of illumination of the transparency.

Certain further difficulties are experienced in the reflector system where the reflector is external to the lamp envelope, for example, transmission losses are experienced at the glass to air interfaces of the lamp envelope, and further, the heat due to these transmission losses may tend to soften and blister the glass envelope.

It is an object of the present invention to provide an improved projection lamp which overcomes the aforementioned difficulties.

Another object of the present invention is to provide a projection lamp of such construction that condensing lenses or external reflectors are not needed.

Briefly stated, according to the present invention, a projection lamp comprises a sealed glass envelope containing an ellipsoidal reflector which constitutes a portion of the ellipsoid unsymmetrical to the axis of the ellipsoid and having one focal point within the glass envelope and the other focal point outside of the glass envelope, and a light source at the focus of the ellipse within the lamp envelope.

The lamp may contain, but does not necessarily have, a light directing baffle of refractory material placed in close proximity to the incandescent filament coils of the projection lamp and on the side of the filament remote from the elliptical reflector, partially encircling or enclosing the portion of the filament away from the elliptical reflector. Such a baffle is more fully described and claimed in co-pending application, Serial No. 744,305 filed June 16, 1958 by Emmett H. Wiley and Elmer G. Fridrich and assigned to the assignee of the present invention.

There are many advantages to the instant construction. The construction according to the present invention offers decreased loss of light as compared to a glass condenser system. Further, as compared to other reflector type systems without a glass condensing lens, there are no lead-in wire shadows in the instant arrangement. Since the reflector in the instant invention may be below the incandescent source, there is less deterioration of the reflector surface due to heat and tungsten vapor. Further, since the portion of the bulb through which the light passes may also be below the source, there is less effect on the amount of transmitted light due to bulb blackening. This offers a considerable improvement in the light maintenance of the lamp with life. Further, the use of the proximity baffle of refractory metal above the incandescent source decreases the amount of energy and metal vapor swept away from the incandescent filament and into the top of the bulb.

Other objects and advantages of the invention will appear to those skilled in the art from the following description and accompanying drawings, in which:

Fig. 1 is an elevation view, partly in section, of a projection lamp embodying the invention, Fig. 2 is an elevation view, partly in section, of a projection lamp embodying a modification according to the present invention and Fig. 3 is a schematic view illustrating the optics of a projection lamp according to the present invention.

In the drawings, similar parts are designated by the same numbers; the longitudinal lamp axis is designated by axis Y—Y, and the light projection or optical axis of the lamp by the axis X—X. It will be noted from the drawings that the filament for a projection lamp, as conventionally built, may consist of a "coiled coil" filament as appears in Fig. 1 and which consists of a coiled wire which, in turn, is coiled thereby forming several large turns or segments; or the filament may be of the "biplane" type, consisting of a series of straight segments of coiled wire, generally in two planes, as illustrated in Fig. 2.

Referring to Fig. 1, there is shown a projection lamp according to the instant invention, which comprises a transparent vitreous sealed envelope or bulb 1 having an opaque coating 2 at one end and base 3 at the other end and enclosing a mount shown generally at 4.

The mount 4 comprises lead-in wires 5 and 6 electrically secured to and supporting a filament 7, herein shown having the form of a coiled coil and which may be of tungsten wire.

The lamp base 3 may be of any desired design, however, as herein illustrated, it consists of a positioning pin 8 and a plurality of lead-in conductors 9, 10, 11 and 12 sealed through the lamp envelope 1. The lead-in supports 5, 6 are secured to the inner end of lead-in wires 10, 11 respectively. A baffle 13 is supported by baffle support wire 14 secured to lead-in conductor 12, the baffle 13 being held in close proximity to the lamp filament. The baffle 13 may be of refractory material, and may suitably be made of a conducting metal such as molybdenum or tungsten. The exact geometric shape and location of baffle 13 with respect to the filament is not critical; it is desirable, but not necessary, that the baffle 13 partially enclose the filament 7 particularly above the filament when the lamp is in operating position, thereby leaving uncovered the portion of the filament 7 which lies toward a reflector shown generally at 15. The baffle 13, due to the cylindrical shape of the filament 7, takes on a generally semi-circular or trough-shaped cross-section and may suitably be constructed of .003 inch molybdenum sheet and placed about 1 mm. from the coil.

According to the invention, the reflector 15 has the shape of a portion of an ellipsoid of revolution; the reflector consists of a portion of the ellipsoid which is unsymmetrical to the axis Z—Z of the ellipsoid, as better seen in Fig. 3. The ellipsoid forming the reflector 15 has a first focus inside the lamp, preferably on the longitudinal axis Y—Y of the lamp, and a second focus outside the lamp envelope on the light axis X—X and away from the lamp envelope, as best seen in Fig. 3. The filament 7 is at the first focus, within the lamp envelope. As shown, the longitudinal axis Y—Y and light axis X—X are at right angles to each other.

The reflector 15 may be supported within the lamp envelope in any convenient manner; as herein illustrated, the reflector 15 comprises a center portion 16 formed of the aforesaid ellipsoid of revolution and a supporting ledge 17 generally surrounding the active reflective center portion 16. Only the ellipsoidal center portion 16 forms part of the optical system of the lamp. The reflector 15, as illustrated, is supported from lead-in wires 5 and 6 and baffle support wire 14 by means of short studs 18 secured to the lead-in wires and fused into bosses on the back side of the reflector 15. Since, of course, lead-in wires 5 and 6 are to carry an electrical potential to bring the filament 7 to incandescence, provision must be made, when the reflector is supported in this manner, so that the reflector does not act to short out the lead-in wires 5, 6. As herein illustrated, the reflector 15 is made of glass and contains a reflective coating of, for example, aluminum or silver, which may be vaporized on the glass surface. The area of the ledge 17 of the reflector 15 which may come in contact with the lead-in wires 5, 6 and 14 may, if desired, be free of conducting coating.

The advantages of the instant invention are best realized when the lamp illustrated is burned with its longitudinal axis Y—Y vertical; the light axis X—X would then be horizontal. In this position, the baffle 13 partially encircles and encloses the filament 7 at its top acting as a restriction to the natural flow of gas within the lamp envelope in an upward direction around the filament and preventing the cooling of the filament by the convection current, and further acting to collect tungsten vapors liberated by the filament thereby minimizing the blackening of the bulb due to the vapors. In this position, since the reflector 15 is below the incandescent filament 7, there is less deterioration of the reflector due to heat and tungsten vapor; further, the portion of the bulb through which the light passes is also below the incandescent filament source, therefore there is less effect on the maintenance of the light output due to the blackening of the bulb. However, the lamp construction of the instant invention is not to be limited to the aforesaid orientation, and satisfactory results may also be realized when the lamp is operated with both its longitudinal axis Y—Y and light axis X—X horizontal; or with the light axis X—X vertical and the longitudinal axis Y—Y horizontal.

As will be best seen from Fig. 3, the need for a condensing lens in the optical system has been eliminated; and, the maximum light source to completely fill the optical system may be used, as previously discussed.

Referring now to Fig. 2, there is shown a modification of the invention applied to a projection lamp having a bi-plane type of filament. The projection lamp includes a bulb 1 having an opaque coating 2 at one end and a base 3 at the other end and enclosing a mount shown generally at 4. The mount 4a includes lead-in wires 5, 6 and a filament 7a of the bi-plane type. The filament 7a is supported by support wires 19, 20 fused into bridges 21, 22 respectively of insulating material, which in turn are secured to the lead-in conductors 5, 6 through bridge support wires 23, 24, 25 and 26. A baffle 13a is desirable, located above the bi-plane filament 7a when the lamp is in operative position and may be supported, for example, by baffle support 27 secured to wire 14a.

As in the modification of Fig. 1 the reflector 15 consists of a portion of an ellipsoid of revolution 16 and a ledge 17 which may nearly surround the ellipsoidal center portion 16. One focus of the ellipse lies on the longitudinal axis of the lamp and coincides with the location of the incandescent filament 7a; the other focus of the ellipse forming the ellipsoid of revolution 16 lies externally of the lamp envelope 1 on the light projection axis X—X. The reflector may be supported in any convenient manner; as herein illustrated, it is made of glass having a reflective coating thereon and is supported in the same manner as shown in Fig. 1 from the studs 18 secured to wires 5, 6 and 14a.

An optical system employing a projection lamp according to the instant invention is illustrated schematically in Fig. 3. The reflector 15 is a portion of the ellipsoid of revolution unsymmetrical to the axis Z—Z of the ellipsoid. It will be noted that the axis Z—Z of revolution of the ellipsoid is at an angle to the light projection axis X—X of the reflector. One focus of the ellipse is within the lamp envelope at point $F_1$ and the other focus of the ellipse is external to the lamp envelope at point $F_2$. A filament 7, herein shown as a coiled coil filament, is located within the lamp envelope at focus $F_1$. If desired, a light redirecting shield or baffle 13 may be used to redirect light to the reflector, as more fully hereinbefore described. The rays of light projected from the incandescent filament 7 at focus $F_1$ are projected from the reflector 15, passed through the lamp envelope, and passed through transparent film located at the film gate 27 of the projection apparatus; focusing at the other focal point $F_2$ and passing into the system's projection lens 28. As illustrated, the external focus $F_2$ may conveniently be located between the film gate 27 and the projection lens 28.

It is readily seen that with such an optical arrangement, the advantages inherent in this system would be realized; for example, when the longitudinal axis Y—Y of the light bulb is in a vertical position, the light is transmitted through a vertical wall of the lamp envelope below the incandescent light source; thereby passing through a portion of the lamp envelope least affected by blackening of the lamp envelope and a portion substantially cooler than that in the vicinity of the incandescent filament. Further, there are no lead-in wire shadows in the image as no lead-in wires appear between the incandescent filament source 7 and the reflector 15 which project the light rays to form the image.

Many modifications may occur to one skilled in the art, for example, the longitudinal axis Y—Y of the lamp and the light axis X—X need not necessarily be at right angles to each other. The invention, therefore, is to be limited only by the claims annexed to and forming a part of this specification.

What I claim as new and desire to secure by Letters Patent of the United States is:

1. An incandescent electric projection lamp comprising a sealed envelope, an ellipsoidal reflector sealed within said envelope and consisting of a portion of an ellipsoid unsymmetrical to the axis of the ellipsoid and having a first focal point within the envelope and a second focal point outside of the envelope, and an incandescent filament at the said first focal point.

2. An incandescent electric projection lamp according to claim 1 and including a light directing baffle in close proximity to the said incandescent filament and placed on the side of the filament remote from the said reflector.

3. An incandescent electric projection lamp having a longitudinal axis and a light projection axis at right angles to the longitudinal axis, and comprising a sealed envelope of vitreous material, an ellipsoidal reflector sealed within said envelope and consisting of a portion of an ellipsoid unsymmetrical to the axis of the ellipsoid and having a first focal point within the envelope on the longitudinal axis of the lamp and a second focal point outside of the lamp envelope on the light projection axis of the lamp, and an incandescent filament at the said first focal point.

4. An incandescent electric projection lamp according to claim 3 and including a light directing baffle in close proximity to the said incandescent filament placed on the side of the filament remote from the said reflector.

5. An incandescent electric projection lamp comprising a sealed envelope, two lead-in wires in said envelope, a support wire in said envelope, a glass ellipsoidal reflector sealed within said envelope and constituting a portion of an ellipsoid unsymmetrical to the axis of the ellipsoid, studs fused into said glass reflector and secured to said lead-in wires for supporting said reflector, said reflector having a first focal point within said envelope and a second focal point outside of said envelope, a reflective coating on said glass reflector, an incandescent filament secured to said lead-in wires at said first focal point, and a light reflecting baffle in close proximity to the incandescent filament on the side of the filament remote from said reflector, said baffle being supported by said support wire.

6. An incandescent electric projection lamp according to claim 5 wherein said filament is of the coiled coil type.

7. An incandescent electric projection lamp according to claim 5 wherein said filament is of the bi-plane type.

8. An incandescent electric projection lamp comprising a sealed envelope, two lead-in wires in said envelope, a glass reflector sealed within said envelope, said reflector constituting a portion of an ellipsoid having a first focal point within said envelope and a second focal point outside of said envelope, a reflective coating on said glass reflector, studs fused into said reflector and secured to said lead-in wires for supporting said reflector, and an incandescent filament secured to said lead-in wires at said first focal point.

9. An electric projection lamp comprising a sealed envelope of vitreous material, a plurality of lead-in wires sealed through the wall of said envelope and extending into the interior thereof, a vitreous reflector within said envelope, said reflector constituting a portion of an ellipsoid having a first focal point within said envelope and a second focal point outside of said envelope, a reflective coating on said vitreous reflector, means supporting said vitreous reflector between said lead-in wires, and a light producing source electrically connected to said lead-in wires and being located at said first focal point.

10. An incandescent electric projection lamp arranged with its longitudinal axis at an angle to its light projection axis comprising a sealed envelope of vitreous material, an ellipsoidal reflector within said envelope comprising a portion of an ellipsoid unsymmetrical to the axis of the ellipsoid with the axis of the ellipsoid extending as a line between the longitudinal and light projection axes of the lamp and with a first focal point within the envelope on the longitudinal axis of the lamp and a second focal point outside of the envelope on the light projection axis of the lamp, and an incandescent filament at the said first focal point.

References Cited in the file of this patent

UNITED STATES PATENTS

| | | |
|---|---|---|
| Re. 17,037 | Ballman et al. | July 17, 1928 |
| 1,190,071 | Adams | July 4, 1916 |
| 1,981,329 | Rivier | Nov. 20, 1934 |
| 2,064,252 | Fortney | Dec. 15, 1936 |
| 2,799,791 | Honing et al. | July 16, 1957 |